(12) United States Patent  
Koyama

(10) Patent No.: US 6,618,108 B2  
(45) Date of Patent: Sep. 9, 2003

(54) LIQUID CRYSTAL DISPLAY DEVICE

(75) Inventor: Hitoshi Koyama, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

(21) Appl. No.: 09/908,625

(22) Filed: Jul. 20, 2001

(65) Prior Publication Data

US 2002/0044239 A1 Apr. 18, 2002

(30) Foreign Application Priority Data

Oct. 16, 2000 (JP) .......................................... 2000-315700

(51) Int. Cl.$^7$ ............................................. G02F 1/1333
(52) U.S. Cl. ..................... 349/110; 349/111; 349/106
(58) Field of Search ................................. 349/110, 111, 349/106, 155, 156, 157, 153

(56) References Cited

U.S. PATENT DOCUMENTS

| | | | | |
|---|---|---|---|---|
| 5,689,320 A | * | 11/1997 | Okada et al. ................ | 349/135 |
| 5,818,554 A | * | 10/1998 | Hiyama et al. ................ | 349/67 |
| 6,151,096 A | * | 11/2000 | McDonnell et al. ........ | 349/188 |
| 6,184,967 B1 | * | 2/2001 | Lagerwall et al. .......... | 349/155 |
| 6,424,394 B1 | * | 7/2002 | Morii .......................... | 349/110 |
| 6,456,354 B2 | * | 9/2002 | Greene et al. .............. | 349/153 |

* cited by examiner

*Primary Examiner*—Kenneth Parker  
*Assistant Examiner*—David Chung  
(74) *Attorney, Agent, or Firm*—Oblon, Spivak, McClelland, Maier & Neustadt, P.C.

(57) ABSTRACT

An active matrix-type liquid crystal display device is provided with a black matrix which prevents light leakage between pixels, wherein the apertures in the black matrix in panel peripheral regions are made smaller than the apertures in the black matrix in the panel center region. Consequently, the occurrence of light leakage due to alignment anomalies arising from the horizontal-direction electric field between the signal lines and scanning lines and the pixel electrodes can be suppressed, and display quality can be enhanced without detracting from manufacturing efficiency or yield and without reducing the brightness of the liquid crystal display device, so that this invention affords excellent advantages.

10 Claims, 5 Drawing Sheets

LIQUID CRYSTAL DISPLAY DEVICE

BACKGROUND OF THE INVENTION

1. Field of the Invention

This invention relates to a liquid crystal display device which displays images using liquid crystals as an optical shutter.

2. Description of the Related Art

Active matrix-type liquid crystal display devices which adopt the twisted nematic display method (hereafter called the "TN display method") are well known. A liquid crystal display device adopting this method has a configuration in which two transparent electrodes driving the liquid crystals are arranged in mutual opposition on a substrate surface. In this configuration, alignment films are deposited covering the wiring formed on the active matrix substrate and opposing substrate, and rubbing processing is performed such that the alignment directions of the films are orthogonal. When the active matrix substrate uses TFTs as the active elements, it is sometimes called a TFT substrate. Because the opposing substrate normally comprises a color filter, it is sometimes called a color filter substrate. Then, these two substrates are bonded together with an adhesive called a sealing agent, and after injection of the liquid crystals, the injection aperture is sealed with resin. The liquid crystal molecules are tilted forward slightly in the rubbing direction—that is, they are inclined so as to face upward in the rubbing direction and downward in the opposite direction (this is called a pretilt), aligned along the active matrix substrate and along the opposing substrate.

In a liquid crystal display device with such a configuration, there are such problems as display unevenness and reduced contrast arising from light leakage due to alignment defects such as reverse tilt, occurring in regions where the horizontal-direction electric field between wiring and pixel electrodes opposes the above-described pretilt of the liquid crystal molecules.

An effective means of resolving such problems is to use the color filter pixel black matrix to block light leakage caused by reverse tilt and other alignment irregularities.

However, in peripheral parts of the panel display area, impurities separating from the sealing agent impede the alignment of liquid crystals, and so there has been the problem that the area where the alignment defects are occurred due to reverse tilt or similar is much larger than near the center of the display area.

SUMMARY OF THE INVENTION

In view of the foregoing, it is an object of the present invention to provide a liquid crystal display device in which the occurrence of light leakage due to alignment anomalies arising from the horizontal-direction electric field between the signal lines and scanning lines and the pixel electrodes can be suppressed, and display quality can be enhanced without detracting from manufacturing efficiency or yield and without reducing the brightness of the liquid crystal display device.

It is another object of the present invention to provide a liquid display device in which the reduction of the brightness of the liquid display device in panel peripheral region is not noticed by an observer.

According to one aspect of the present invention, for achieving the above-mentioned objects, there is provided an active matrix-type liquid crystal display device, having a black matrix which prevents light leakage between pixels, wherein the apertures in the black matrix in panel peripheral regions are made smaller than the apertures in the black matrix in the panel center region.

According to another object of the present invention, there is provided a liquid crystal display device, wherein the apertures in the black matrix in the peripheral regions of the panel are made smaller in stages as moving away from the center region.

Consequently, the liquid crystal display devices of the aspects of this invention are in which, by increasing the pixel black matrix width on the opposing color filter substrate in the panel peripheral regions compared with the panel center region, the occurrence of light leakage due to alignment anomalies arising from the horizontal-direction electric field between the signal lines and scanning lines and the pixel electrodes can be suppressed, and display quality can be enhanced without detracting from manufacturing efficiency or yield and without reducing the brightness of the liquid crystal display device, so that this invention affords excellent advantages.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DESCRIPTION OF THE PREFERRED EMBODIMENTS

A preferred embodiment of the invention will now be described in detail, referring to the accompanying drawings.

Initially, the circumstances leading up to the conception of this invention are explained.

As stated above, in conventional liquid crystal display devices, impurities separated from the sealing agent at the periphery of the panel display area impede the alignment of the liquid crystals, and the area where the reverse tilt and other alignment defects are occurred, is large compared with the center of the display area.

Figure 6:
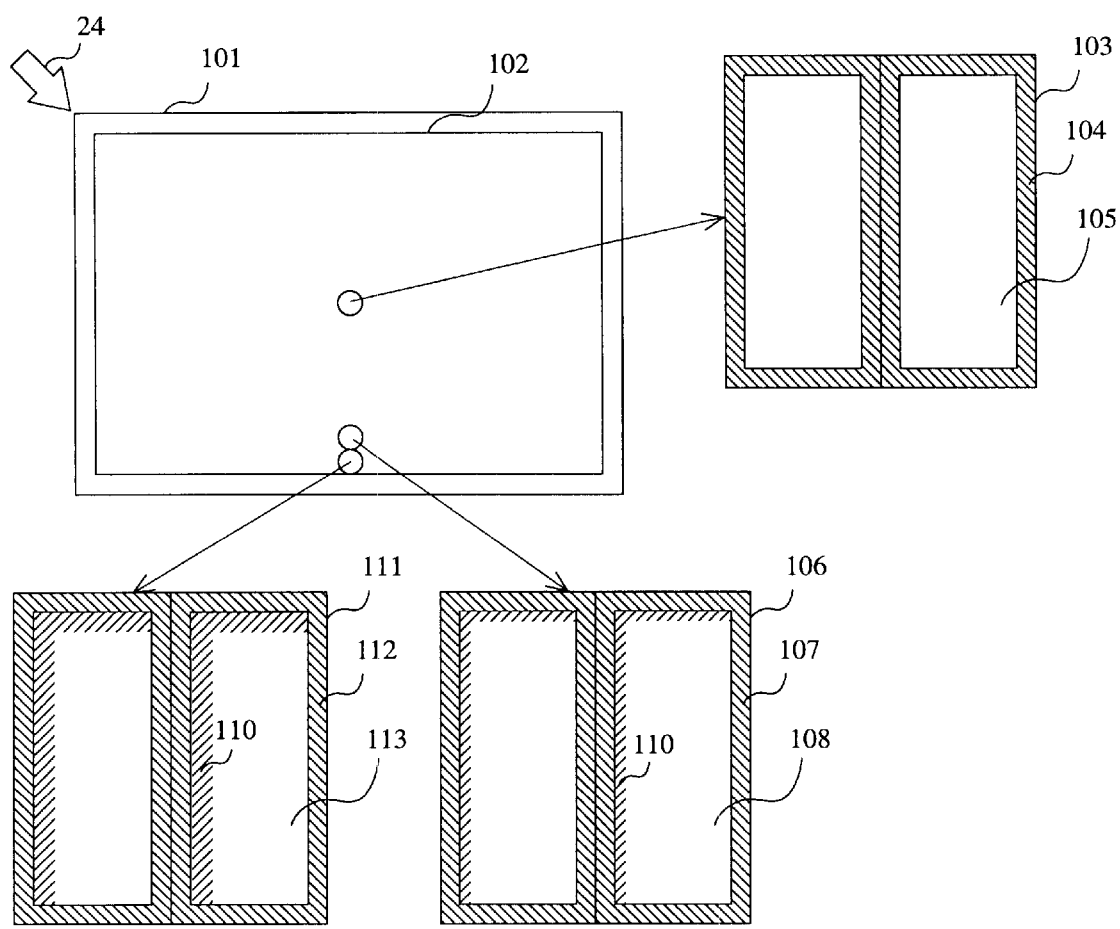
FIG. 6 is a diagram showing a color filter black matrix of a liquid crystal display device in accordance with the other example than the present invention.

This problem is further explained using FIG. 6. FIG. 6 shows a pixel 103 near the center of the display area 102 of the liquid crystal display device 101, a pixel 106 near a display area border, and a pixel 111 at the display area border. The black matrix 104, 107, 112 of color filter pixels is designed in a size which blocks light leakage due to reverse tilt and other alignment defects occurring near the center of the display area, and is designed at the same size near the center and at the periphery of the display area.

After forming alignment films on the color filter substrate and the TFT substrate using a transfer method, the alignment film surfaces are subjected to rubbing, the two substrates are bonded together, and liquid crystals are injected to obtain a liquid crystal panel. These use publicly known manufacturing methods such as those disclosed in for example Japanese Patent Laid-open No. H10-325951, and so a detailed explanation is omitted.

At the pixel 103 near the center of the display area, there is no occurrence of problems with display unevenness or reduced contrast arising from light leakage due to reverse tilt and other alignment defects; but at the pixel 106 near a display area border, and at the pixel 111 at a display area border, there is the problem that light leakage 110 occurs due to reverse tilt and other alignment defects, so that display unevenness and reduced contrast result.

One conceivable means of resolving such problems is the method of increasing the black matrix over the entire panel display area, such that light leakage due to alignment irregularities on the periphery of the panel display area is completely blocked.

However, the method of increasing the black matrix so as to completely block light leakage due to alignment defects in the panel display area peripheral regions has the following problems. If a method is adopted in which the black matrix is increased so as to completely block light leakage due to alignment defects in the panel display area peripheral regions, there is the possibility that the problem of display unevenness and reduced contrast due to light leakage caused by reverse tilt and other light leakage can be alleviated. However, in this method the pixel aperture is small, there is the problem that panel transmissivity is reduced, and display by the liquid crystal display device becomes dark.

Hence the inventor of this invention focused on the fact that impurities separating from the sealing agent impede the alignment of liquid crystals in the peripheral regions of the panel display area, and that the area of occurrence of reverse tilt and other alignment defects is larger than at the center of the display area, and studied methods to, in essence, increase only the black matrix in the peripheral regions of the display area, compared with the center area. Moreover, methods were also studied for increasing in steps the black matrix of color filter pixels only near the panel display peripheral regions, toward the panel area borders. The following results were obtained, and are explained below.

As a result of detailed studies of the circumstances of occurrence of reverse tilt and other alignment defects, the following four facts were identified.

(1) Fact 1

The region within which the area of occurrence of reverse tilt and other alignment defects is larger than near the center of the display area is limited to within 30 mm from the peripheral regions of the display area.

(2) Fact 2

The area of occurrence of reverse tilt and other alignment defects in the display area peripheral regions is, at maximum, 5 μm larger than near the center of the display area.

(3) Fact 3

The area of occurrence of reverse tilt and other alignment defects is greatest in the display area peripheral regions, becomes smaller in steps from this region, and is essentially the same from 30 mm from the display area periphery to the display area center.

(4) Fact 4

The larger area of occurrence of reverse tilt and other alignment defects in the display area peripheral regions compared with near the display area center is limited to one particular edge out of the four pixel edges, or to two particular adjacent edges.

Based on these facts 1 through 4, methods for increasing the black matrix size in the display area peripheral regions were studied. When expanding the black matrix width, due to constraints imposed by mask fabrication technology, the minimum increase is 0.1 μm.

Embodiment 1.

Below, an embodiment 1 of the invention is explained using FIG. 1.

Figure 1:
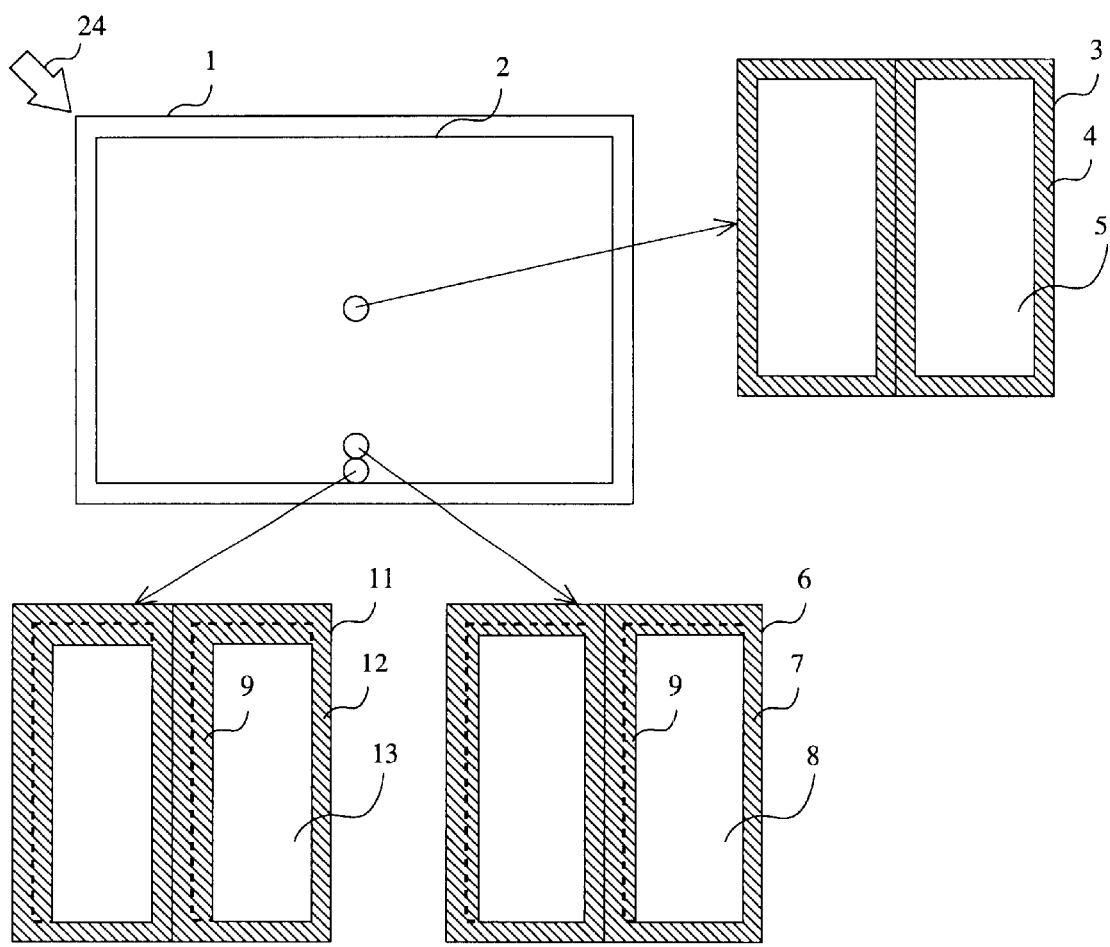
FIG. 1 is a diagram showing a color filter black matrix of a liquid crystal display device in accordance with the present invention.

In FIG. 1, similarly to FIG. 6, a pixel 3 near the center of the display area 2 of the liquid crystal display device 1, a pixel 6 in the display area near a border, and a pixel 11 at a display area border are shown. In FIG. 1, the arrow 24 is the rubbing direction.

As a result of advance evaluations of reverse tilt and other alignment defects in the display area center region and display area peripheral regions of this liquid crystal display device 1, within 30 mm of the pixel display area periphery, an enlargement was observed in the area of occurrence of reverse tilt and other alignment defects, compared with the display area center, along the left edges and top edges of pixels. The enlargement of the width of the alignment defect area grew larger in stages in moving from 30 mm from the pixel display area periphery toward the display area periphery, and was greatest in the display area border pixels, measuring 4 μm at the pixel left edges and 5 μm at the pixel top edges compared with the display area center region. In this embodiment, an epoxy resin is used as the sealing agent. This sealing agent contains silicon in order to enhance shock resistance. It is studied that alignment defects are caused by dissolution of silicon into the liquid crystals.

Figure 2:
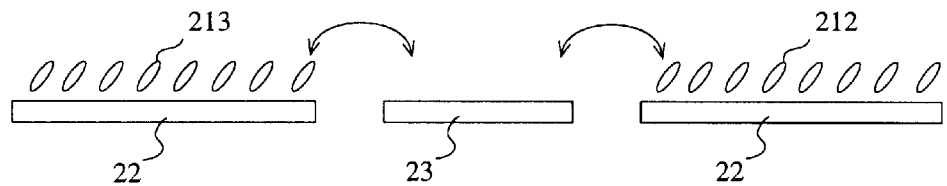
FIG. 2 is a diagram showing a color filter black matrix of a liquid crystal display device in accordance with the present invention.
Figure 3:
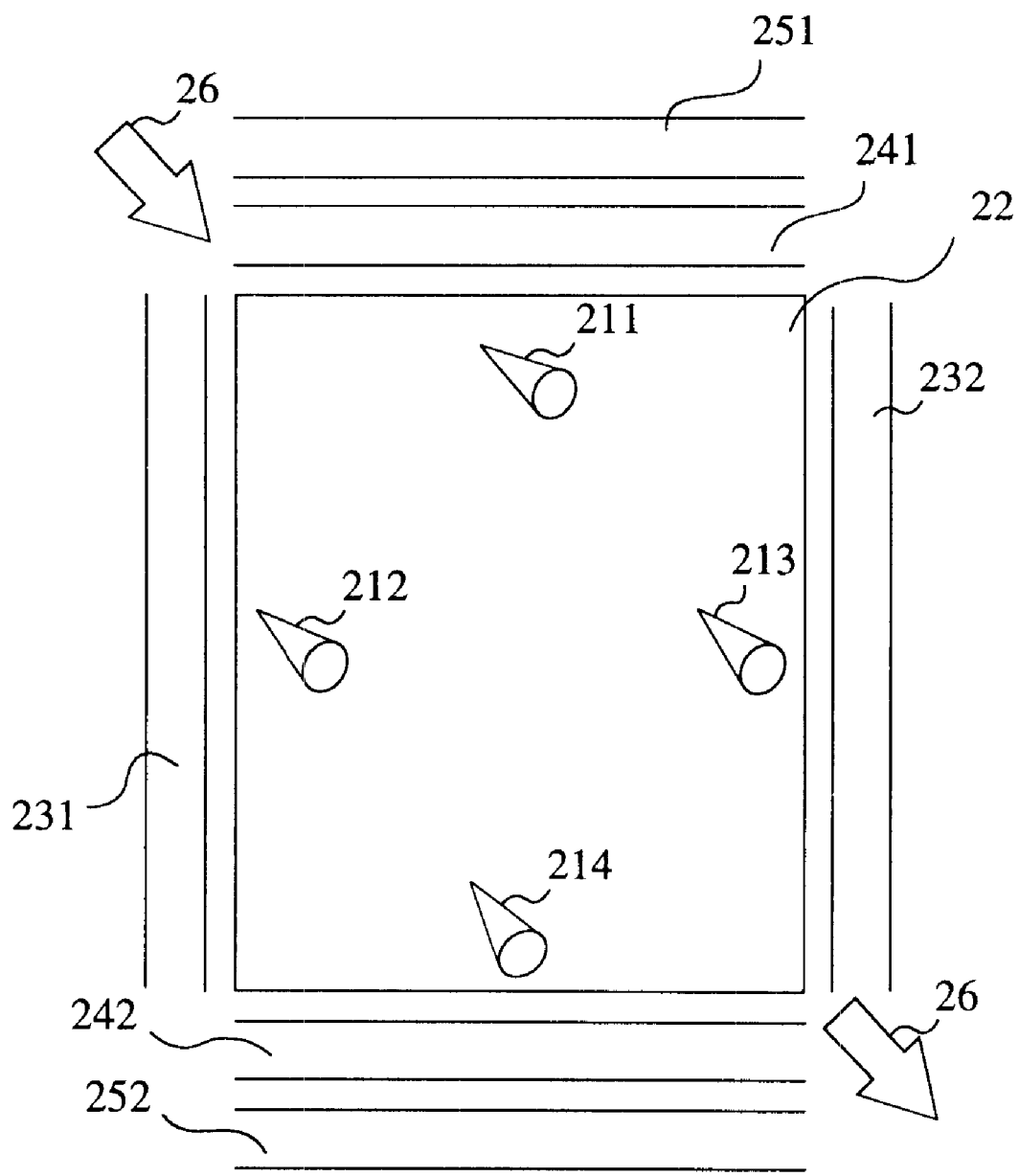
FIG. 3 is a diagram showing a color filter black matrix of a liquid crystal display device in accordance with the present invention.

Below, FIG. 2 and FIG. 3 are used to explain the reason for the occurrence of alignment defects only at the left and top edges of pixels. In FIG. 2, reference numerals 212 and 213 are liquid crystal molecules, reference numeral 22 are pixel electrodes, and reference numeral 23 is a source electrode. Due to rubbing processing, a pretilt occurs in the liquid crystal molecules 212, 213, as shown in the figure. When the liquid crystal display panel is driven and a voltage is applied to the source electrode 23, an electric field, like that shown by the arrow in the figure, occurs between the source electrode 23 and the pixel electrodes 22. This electric field affects the alignment of the liquid crystal molecules 212, 213. In the case of the liquid crystal molecule 213, because the electric field acts to impart an inclination in the same direction as the inclination due to rubbing, no problem in particular arises. But in the case of the liquid crystal molecule 212, an electric field occurs which imparts an inclination in the direction opposite the inclination due to rubbing, and so acts to tilt the inclination due to rubbing in the opposite direction. That is, the reverse tilt phenomenon is caused. Hence the reverse tilt phenomenon occurs in the display area in proximity to the source electrode on the side opposite the direction of the inclination due to rubbing, and light leakage readily occurs.

FIG. 3 is a diagram seen from above a pixel. In the drawing, reference numerals 231 and 232 are source electrodes; reference numerals 241 and 242 are gate electrodes; and reference numerals 251 and 252 are common auxiliary capacitance electrodes. Reference numeral 26 shows the rubbing direction. In a liquid crystal display panel with such a configuration, an electric field occurs between the pixel electrode 22 and the source electrodes 231, 232; between the pixel electrode 22 and the gate electrodes 241, 242; and between the pixel electrode 22 and the common auxiliary capacitance electrodes 251, 252. As shown in the drawing, the liquid crystal molecules 211, 212, 213, 214 are each aligned in the rubbing direction 26.

The liquid crystal molecule 212, positioned near the source electrode 231 on the side opposite the direction of inclination of liquid crystal molecules due to rubbing, is affected by the electric field between this source electrode 231 and the pixel electrode 22, and readily undergoes the reverse tilt phenomenon. The liquid crystal molecule 211, positioned near the gate electrode 241 and the common auxiliary capacitance electrode 251 on the side opposite the direction of inclination of liquid crystals due to rubbing, is affected by the electric field between this gate electrode 241 and the pixel electrode 22 and by the electric field between the common auxiliary capacitance electrode 251 and the pixel electrode 22, and readily undergoes the reverse tilt phenomenon. On the other hand, the liquid crystal molecules 213 and 214 do not readily undergo the reverse tilt phenomenon.

Thus reverse tilt occurs readily in liquid crystal molecules in proximity to electrodes on the opposite side from the direction of inclination of liquid crystal molecules due to rubbing; and in the panel peripheral regions in particular, alignment is weakened due to the effect of impurities separated from the sealing agent, so that reverse tilt occurs more readily. For this reason, it is studied, in this aspect light leakage due to reverse tilt occurs in the areas at the left edge and top edge of the pixel.

Based on the above results, the size of the pixel black matrix in the color filter was enlarged in the left and top edges of pixels within 30 mm of the periphery of the display area, and the aperture was narrowed. In the figures, the parts denoted by 9 are parts with size enlarged. Enlargement of the pixel black matrix of the color filter was 4 μm at the pixel left edge and 5 μm at the pixel top edge at the borders of the display area; from this, the black matrix enlargement width was decreased in steps, and the black matrix was not enlarged in pixels from 30 mm from the display area periphery to the center region; the width was the same as at the center of the display area. The enlargement width was broadened in direct proportion to the distance from the center.

After forming alignment films by the transfer method on a color filter substrate having such a black matrix and on a TFT substrate, the alignment film surfaces were subjected to rubbing, and the two were bonded together and liquid crystals were injected to obtain a liquid crystal panel. Here widely known manufacturing methods were used, so a detailed explanation is omitted.

Upon inputting driving signals to this panel and performing observations with a microscope, no reverse tilt or other alignment defects whatsoever due to the horizontal-direction electric field between the source and gate signal lines and the pixel electrodes were found within pixel apertures, nor was any display unevenness at all recognized in visual inspections. On measuring the brightness of the liquid crystal display device, a reduction in brightness of 5% was confirmed compared with a liquid crystal display device in which the pixel black matrix was not modified in the display area periphery; but over most of the display area, brightness comparable to that of a liquid crystal display device with no modification of the pixel black matrix was maintained, and impressions of the display were found to be virtually unchanged.

Embodiment 2.

Figure 4:
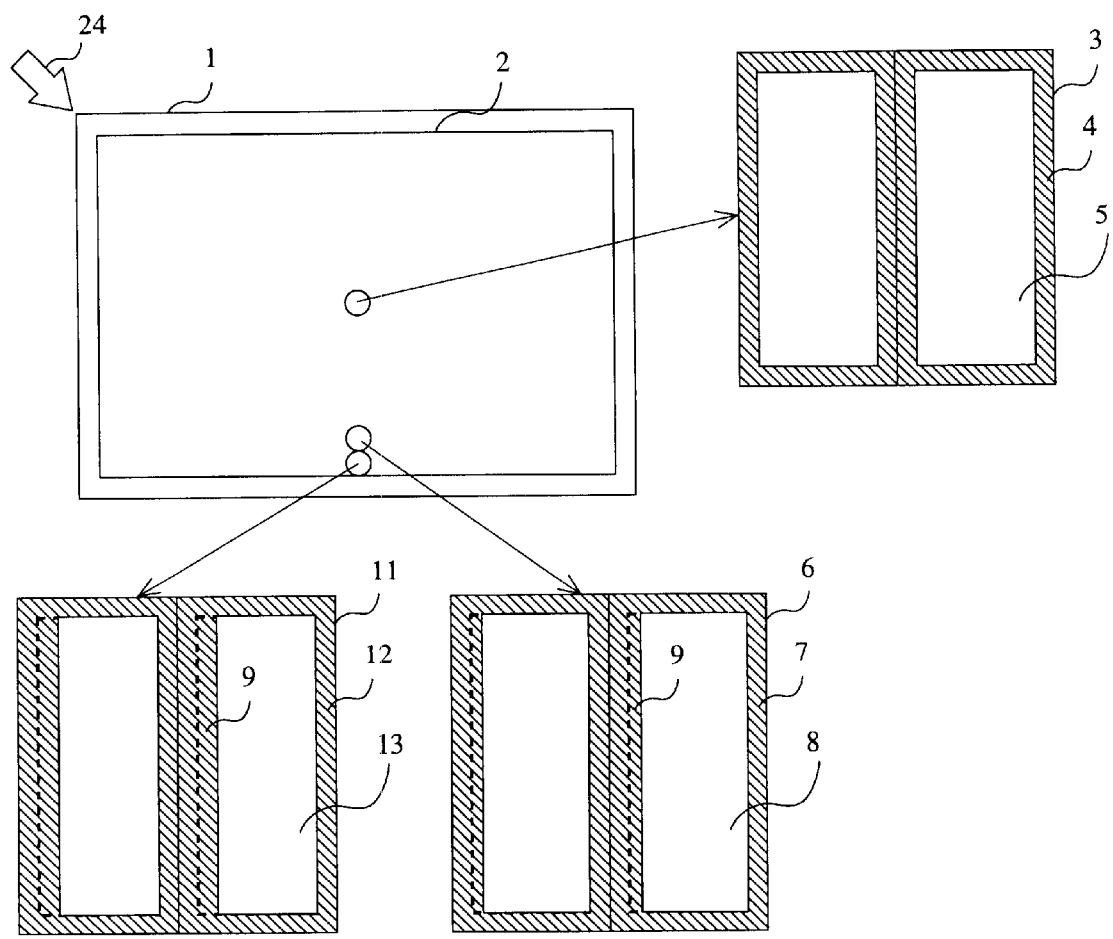
FIG. 4 is a diagram showing a color filter black matrix of a liquid crystal display device in accordance with the present invention.

An embodiment 2 of the invention is explained using FIG. 4. The liquid crystal display device 1 of the embodiment 2 has design specifications differing from those of the above first aspect. FIG. 4 shows a pixel 3 near the center of the display area 2 of the liquid crystal display device 1, a pixel 6 near a display area border, and a pixel 11 at a display area border.

As a result of advance evaluations of reverse tilt and other alignment defects in the center region and peripheral regions of the display area 2 of this liquid crystal display device 1, within 25 mm of the pixel display area periphery, an enlargement was observed, at the left edges of pixels, in the area of reverse tilt and other alignment defects compared with the display area center region. The enlargement of the width of the alignment defect area grew larger in stages in moving from 25 mm from the pixel display area periphery toward the display area periphery, and was greatest in the display area border pixels, at 5 μm compared with the display area center region.

Based on the above results, the size of the pixel black matrix of the color filter was increased at pixel left edges, and the aperture narrowed, in the region up to 25 mm from the display area borders. The enlargement of the black matrix at pixel left edges in the color filter was 5 μm for pixels at display area borders, and the black matrix enlargement width was reduced in stages moving from this, with no black matrix enlargement at pixel left edges from 25 mm from the display area borders to the center region, and the same width used as at the display area center.

After thus forming alignment films on a color filter substrate having a black matrix and on a TFT substrate using a transfer method, rubbing of the alignment film surfaces was performed, the two were bonded together, liquid crystals were injected, and a liquid crystal panel was obtained. These used widely-known manufacturing methods, and so a detailed explanation is omitted.

Upon inputting driving signals to this panel and performing observations with a microscope, no reverse tilt or other alignment defects whatsoever due to the horizontal-direction electric field between the source and gate signal lines and the pixel electrodes were found within pixel apertures, nor was any display unevenness at all recognized in visual inspections. On measuring the brightness of the liquid crystal display device, a reduction in brightness of 4% or less was confirmed compared with a liquid crystal display device in which the pixel black matrix was not modified in the display area periphery, that is, having the same black matrix width over the entire display area; but over most of the display area, brightness comparable to that of a liquid crystal display device with no modification of the pixel black matrix was maintained, and impressions of the display were found to be virtually unchanged.

Embodiment 3.

Figure 5:
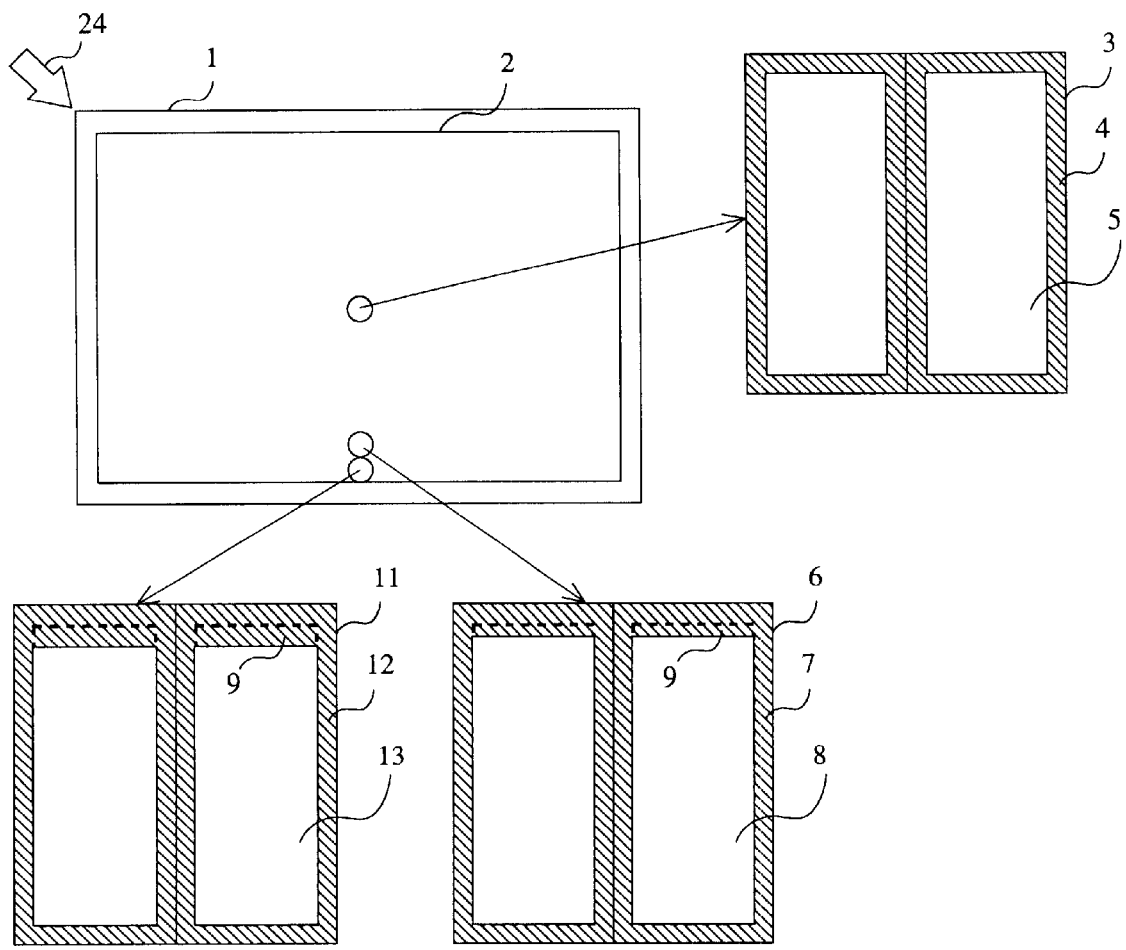
FIG. 5 is a diagram showing a color filter black matrix of a liquid crystal display device in accordance with the present invention.

An embodiment 3 of the invention is explained using FIG. 5. The liquid crystal display device 1 of the embodiment 3 has design specifications differing from those of the above embodiments 1 and 2. FIG. 5 shows a pixel 3 near the center of the display area 2 of the liquid crystal display device 1, a pixel 6 near a display area border, and a pixel 11 at a display area border.

As a result of advance evaluations of reverse tilt and other alignment defects in the center region and peripheral regions of the display area of this liquid crystal display device, within 28 mm of the pixel display area periphery, an enlargement was observed, at the top edges of pixels, in the area of reverse tilt and other alignment defects compared with the display area center region. The enlargement of the width of the alignment defect area grew larger in stages in moving from 28 mm from the pixel display area periphery toward the display area periphery, and was greatest in the display area border pixels, at 5 μm compared with the display area center region.

Based on the above results, the size of the pixel black matrix of the color filter was increased at pixel top edges, and the aperture narrowed, in the region up to 28 mm from the display area borders. The enlargement of the black matrix at pixel top edges in the color filter was 5 μm for pixels at display area borders, and the black matrix enlargement width was reduced in stages moving from this, with no black matrix enlargement at pixel left edges from 28 mm from the display area borders to the center region, and the same width used as at the display area center.

After thus forming alignment films on a color filter substrate having a black matrix and on a TFT substrate using a transfer method, rubbing of the alignment film surfaces was performed, the two were bonded together, liquid crystals were injected, and a liquid crystal panel was obtained. These used widely-known manufacturing methods, and so a detailed explanation is omitted.

Upon inputting driving signals to this panel and performing observations with a microscope, no reverse tilt or other alignment defects whatsoever due to the horizontal-direction electric field between the source and gate signal lines and the pixel electrodes were found within pixel apertures, nor was any display unevenness at all recognized in visual inspections. On measuring the brightness of the liquid crystal display device, a reduction in brightness of 2% or less was confirmed compared with a liquid crystal display device in which the pixel black matrix was not modified in the display area periphery; but over most of the display area, brightness comparable to that of a liquid crystal display device with no modification of the pixel black matrix was maintained, and impressions of the display were found to be virtually unchanged.

Embodiment 4.

The liquid crystal display device 1 of an embodiment 4 has design specifications differing from those of the above embodiments 1 through 3. As a result of advance evaluations of reverse tilt and other alignment defects in the center region and peripheral regions of the display area of this liquid crystal display device, within 6 mm of the pixel display area periphery, an enlargement was observed, at the left and top edges of pixels, in the area of reverse tilt and other alignment defects compared with the display area center region. The enlargement of the width of the alignment defect area grew larger in stages in moving from 6 mm from the pixel display area periphery toward the display area periphery, and was greatest in the display area border pixels, at 1 μm on pixel left edges and 0.8 μm on pixel top edges, compared with the display area center region.

Based on the above results, the size of the pixel black matrix of the color filter was increased at pixel left edges and top edges, and the aperture narrowed, in the region up to 6 mm from the display area borders. The enlargement of the black matrix at pixel top edges in the color filter was 1 μm for the left edges and 0.8 μm for the top edges of pixels at display area borders, and the black matrix enlargement width was reduced in stages moving from this, with no black matrix enlargement at pixel left edges from 6 mm from the display area borders to the center region, and the same width used as at the display area center.

After thus forming alignment films on a color filter substrate having a black matrix and on a TFT substrate using a transfer method, rubbing of the alignment film surfaces was performed, the two were bonded together, liquid crystals were injected, and a liquid crystal panel was obtained. These used widely-known manufacturing methods, and so a detailed explanation is omitted.

Upon inputting driving signals to this panel and performing observations with a microscope, no reverse tilt or other alignment defects whatsoever due to the horizontal-direction electric field between the source and gate signal lines and the pixel electrodes were found within pixel apertures, nor was any display unevenness at all recognized in visual inspections. On measuring the brightness of the liquid crystal display device, a reduction in brightness of 2% or less was confirmed compared with a liquid crystal display device in which the pixel black matrix was not modified in the display area periphery; but over most of the display area, brightness comparable to that of a liquid crystal display device with no modification of the pixel black matrix was maintained, and impressions of the display were found to be virtually unchanged.

Embodiment 5.

As a result of advance evaluations of reverse tilt and other alignment defects in the center region and peripheral regions of the display area in a liquid crystal display device having design specifications differing from those of the above embodiment 1 through 4, within 7 mm of the pixel display area periphery, an enlargement was observed, at the left edges of pixels, in the area of reverse tilt and other alignment defects compared with the display area center region. The enlargement of the width of the alignment defect area grew larger in stages in moving from 7 mm from the pixel display area periphery toward the display area periphery, and was greatest in the display area border pixels, at 0.9 μm, compared with the display area center region.

Based on the above results, the size of the pixel black matrix of the color filter was increased at pixel left edges, and the aperture narrowed, in the region up to 7 mm from the display area borders. The enlargement of the black matrix at pixel top edges in the color filter was 0.9 μm for pixels at display area borders, and the black matrix enlargement width was reduced in stages moving from this, with no black matrix enlargement at pixel left edges from 7 mm from the display area borders to the center region, and the same width used as at the display area center.

After thus forming alignment films on a color filter substrate having a black matrix and on a TFT substrate using a transfer method, rubbing of the alignment film surfaces was performed, the two were bonded together, liquid crystals were injected, and a liquid crystal panel was obtained. These used widely-known manufacturing methods, and so a detailed explanation is omitted.

Upon inputting driving signals to this panel and performing observations with a microscope, no reverse tilt or other alignment defects whatsoever due to the horizontal-direction electric field between the source and gate signal lines and the pixel electrodes were found within pixel apertures, nor was any display unevenness at all recognized in visual inspections. On measuring the brightness of the liquid crystal display device, a reduction in brightness of 1% or less was confirmed compared with a liquid crystal display device in which the pixel black matrix was not modified in the display area periphery; but over most of the display area, brightness comparable to that of a liquid crystal display device with no modification of the pixel black matrix was maintained, and impressions of the display were found to be virtually unchanged.

Embodiment 6.

As a result of advance evaluations of reverse tilt and other alignment defects in the center region and peripheral regions of the display area in a liquid crystal display device having design specifications differing from those of the above embodiment 1 through 5, within 5 mm of the pixel display area periphery, an enlargement was observed, at the top edges of pixels, in the area of reverse tilt and other alignment defects compared with the display area center region. The enlargement of the width of the alignment defect area grew larger in stages in moving from 5 mm from the pixel display area periphery toward the display area periphery, and was greatest in the display area border pixels, at 1.1 μm, compared with the display area center region.

Based on the above results, the size of the pixel black matrix of the color filter was increased at pixel top edges, and the aperture narrowed, in the region up to 5 mm from the display area borders. The enlargement of the black matrix at pixel top edges in the color filter was 1.1 μm for pixels at display area borders, and the black matrix enlargement width was reduced in stages moving from this, with no black matrix enlargement at pixel top edges from 5 mm from the display area borders to the center region, and the same width used as at the display area center.

After thus forming alignment films on a color filter substrate having a black matrix and on a TFT substrate using a transfer method, rubbing of the alignment film surfaces was performed, the two were bonded together, liquid crystals were injected, and a liquid crystal panel was obtained. These used widely-known manufacturing methods, and so a detailed explanation is omitted.

Upon inputting driving signals to this panel and performing observations with a microscope, no reverse tilt or other alignment defects whatsoever due to the horizontal-direction electric field between the source and gate signal lines and the pixel electrodes were found within pixel apertures, nor was any display unevenness at all recognized in visual inspections. On measuring the brightness of the liquid crystal display device, a reduction in brightness of 0.5% or less was confirmed compared with a liquid crystal display device in which the pixel black matrix was not modified in the display area periphery; but over most of the display area, brightness comparable to that of a liquid crystal display device with no modification of the pixel black matrix was maintained, and impressions of the display were found to be virtually unchanged.

First Comparison Example

A liquid crystal display device was fabricated which had the same design specifications as the liquid crystal display device described in the above embodiment 1, except that no enlargement whatsoever of the pixel black matrix width in the color filter was performed in the display area periphery; upon inputting driving signals and performing observations with a microscope, light leakage due to alignment defects in the display area peripheral regions was confirmed, and in visual inspections, bright defects were recognized in the display area periphery, so that inspections were failed.

Second Comparison Example

A liquid crystal display device 1 was fabricated which had the same design specifications as the liquid crystal display device described in the above embodiment 1, except for enlargement by 4 μm of the pixel left edges and by 5 μm of the pixel top edges of the black matrix of the color filter over the entire display area; upon inputting driving signals and performing observations with a microscope, no light leakage whatsoever due to alignment defects in the display area peripheral regions was confirmed, nor was any display unevenness at all recognized in visual inspections. However, on measuring the brightness of the liquid crystal display device, a reduction in brightness of 5% was confirmed compared with a liquid crystal display device in which the pixel black matrix was not modified across the entire panel, and the display gave the impression of being dark.

From the embodiment 1 through 6, and from the first and second comparison examples, it was found that problems with display unevenness and reduced contrast arising from light leakage due to reverse tilt and other alignment defects could be easily resolved, and display quality enhanced, by increasing the size of the pixel black matrix in the color filter only in the panel display area periphery, without detracting from manufacturing efficiency or yield and without lowering the liquid crystal display device brightness.

In the above examples, the width of the black matrix in the peripheral regions of the liquid crystal panel was increased, and this width was narrowed in stages in moving toward the center; however, the present invention is not limited to this, and if the width is greater in the peripheral regions of the liquid crystal panel than at the center, the width in the peripheral regions may be made constant. In this case, it is desirable that the difference in the width of the black matrix in the peripheral regions and in the center be for example 1 μm, and not be large. This is because if the difference is large, the boundary between the peripheral regions and the center region will be clearly displayed.

As described above, the liquid crystal display devices of the aspects of this invention are active-matrix type liquid crystal display devices employing thin film transistors as switching elements, in which, by increasing the pixel black matrix width on the opposing color filter substrate in the panel peripheral regions compared with the panel center region, the occurrence of light leakage due to alignment anomalies arising from the horizontal-direction electric field between the signal lines and scanning lines and the pixel electrodes can be suppressed, and display quality can be enhanced without detracting from manufacturing efficiency or yield and without reducing the brightness of the liquid crystal display device, so that this invention affords excellent advantages.

While preferred embodiments of the invention have been described using specific terms, such description is for illustrative purposes only, and it is to be understood that changes and variations may be made without departing from the spirit or scope of the following claims.

What is claimed is:

1. A liquid crystal display device, comprising:
   a display area including a plurality of pixels in a matrix layout; and
   a black matrix formed over the display area and configured to prevent light leakage between the plurality of pixels, said black matrix comprising a panel border, a panel peripheral region, and a panel center region, said panel peripheral region and said panel center region each comprising apertures,
   wherein the apertures in the panel peripheral region are smaller than the apertures in the panel center region.

2. The liquid crystal display device according to claim 1, wherein the apertures in the panel peripheral region are increasingly smaller as an aperture distance from the center region increases.

3. The liquid crystal display device according to claim 2, wherein the apertures in the panel peripheral region are increasingly smaller in proportion to the aperture distance from the center region.

4. The liquid crystal display device according to claim 1, wherein the panel peripheral region is within 30 mm from the panel border.

5. The liquid crystal display device according to claim 1, wherein the difference between the width of the panel peripheral region and the width of the panel center region is in the range of 0.1 μm and 5 μm, inclusively.

6. The liquid crystal display device according to claim 1, wherein each of the apertures comprise:

four sides, wherein one side of the apertures in the panel peripheral region is smaller than a corresponding side of the apertures in the panel center region.

7. The liquid crystal display device according to claim 1, wherein each of the apertures comprises:

four sides, wherein two adjacent sides of the apertures in the panel peripheral region are smaller than a corresponding two adjacent sides of the apertures in the panel center region.

8. The liquid crystal display device according to claim 6, further comprising:

a peripheral electrode, wherein said one side of the apertures is a side closest to the peripheral electrode, said side closest to the peripheral electrode being in a direction opposite a direction of inclination of the liquid crystals due to rubbing;

wherein one side of the apertures in the panel peripheral region is smaller than a corresponding side of the apertures in the panel center region.

9. A color filter substrate, comprising:

a display area including color filters for a plurality of pixels, said display area comprising a display area peripheral region and a display area center region; and a black matrix configured to prevent light leakage between the plurality of pixels and comprising apertures, wherein the apertures in a portion of the black matrix corresponding to the display area peripheral region are smaller than the apertures in a portion of the black matrix corresponding to the display area center region.

10. The color filter substrate according to claim 9, wherein the apertures in the portion of the black matrix corresponding to the display area peripheral region are increasingly smaller as an aperture distance from the display area center region increases.

* * * * *